(12) United States Patent
Iseno

(10) Patent No.: US 7,750,775 B2
(45) Date of Patent: Jul. 6, 2010

(54) CONTROL UNIT

(75) Inventor: Atsumu Iseno, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 12/030,405

(22) Filed: Feb. 13, 2008

(65) Prior Publication Data

US 2008/0237102 A1 Oct. 2, 2008

(30) Foreign Application Priority Data

Mar. 30, 2007 (JP) ............... 2007-091028

(51) Int. Cl.
*H01F 1/00* (2006.01)
*H01F 3/00* (2006.01)
*H01F 7/00* (2006.01)
*B01D 35/06* (2006.01)
*B03C 1/30* (2006.01)
*C02F 1/48* (2006.01)

(52) U.S. Cl. .............. 335/296; 335/297; 210/695; 210/167.03; 210/167.29; 210/222; 210/223; 123/196 A

(58) Field of Classification Search .......... 210/695, 210/167.03, 167.29, 222–223; 335/296–297; 123/196 A
See application file for complete search history.

(56) References Cited

U.S. PATENT DOCUMENTS 2,321,710 A * 6/1943 Stoller .................. 335/108
2,464,978 A * 3/1949 Hines .................. 246/169 R
2,959,288 A * 11/1960 Fowler .................. 210/222
4,176,065 A * 11/1979 Cook .................. 210/223
4,563,286 A * 1/1986 Johnson et al. .......... 210/721
6,337,613 B1* 1/2002 Grelier et al. .............. 335/8
2002/0027489 A1* 3/2002 Letient .................. 335/202
2003/0000733 A1* 1/2003 Mohan et al. .......... 174/149 B
2005/0162245 A1* 7/2005 Zhou et al. .............. 335/106
2007/0080767 A1* 4/2007 Kuzmenka .............. 335/209

FOREIGN PATENT DOCUMENTS

JP 2004-028189 A 1/2004

* cited by examiner

*Primary Examiner*—Lincoln Donovan
*Assistant Examiner*—Mohamad A Musleh
(74) *Attorney, Agent, or Firm*—Foley & Lardner LLP

(57) ABSTRACT

A control unit includes a plurality of electronic components; and at least two metal busbars disposed along each other. Each of the at least two metal busbars establishes an electrical connection between the electronic components and includes a magnetic-material portion. The at least two metal busbars are arranged to cause the magnetic-material portion of one of the at least two metal busbars to have magnetic poles generating a magnetic force substantially in the same direction as that of the magnetic-material portion of another of the at least two metal busbars which is adjacent to the magnetic-material portion of the one of the at least two metal busbars.

6 Claims, 4 Drawing Sheets

ND UNIT

BACKGROUND OF THE INVENTION

The present invention relates to a control unit.

For example in the case where a control unit for controlling a transmission for a vehicle or the like is mounted inside a transmission casing; a lubricating oil is flowing inside the transmission casing, and hence there is a possibility that a contamination (contaminants) included in the lubricating oil enters into the control unit. Accordingly, there is a possibility that such a contamination establishes an electrical connection between wires of the control unit so that a short circuit between the wires is caused and thereby the control unit does not work properly.

In order to solve such a problem, Japanese Patent Application Publication No. 2004-28189 discloses a previously proposed control unit. In this technique, by providing the coil magnet inside a control unit, the contamination is forced to stick to the coil magnet. Also in this technique, the wires are covered by a base member and a cover. Thus, the short circuit, that is caused between wires of the control unit due to the contamination, is suppressed.

SUMMARY OF THE INVENTION

However, in the case where a coil magnet is provided inside the control unit as the technique disclosed in the above patent application, a magnet force of the coil magnet becomes weaker as a distance from the coil magnet becomes longer. Accordingly, the coil magnet cannot attract the contamination in an area having a long distance from the coil magnet, and hence the short circuit that is caused between wires of the control unit due to the contamination cannot be sufficiently suppressed. If the number of coil magnet is increased as a countermeasure to this, there is another problem that the control unit cannot be designed to be small.

Moreover, in the case where the wires are covered by the base member and the cover, if the wiring of the control unit is complex, it is necessary to form the base member and the cover in complex shapes corresponding to this complex wiring and also it is necessary to secure a large space for mounting the base member or the cover between the wires. Therefore, there is a problem that the control unit cannot be designed to be small.

It is therefore an object of the present invention to provide a control unit, devised to suppress the short circuit of wires due to a contamination and also devised to design the control unit to be small.

According to one aspect of the present invention, there is provided a control unit comprising: a plurality of electronic components; and at least two metal busbars disposed along each other, wherein each of the at least two metal busbars establishes an electrical connection between the electronic components and includes a magnetic-material portion, wherein the at least two metal busbars are arranged to cause the magnetic-material portion of one of the at least two metal busbars to have magnetic poles generating a magnetic force substantially in the same direction as that of the magnetic-material portion of another of the at least two metal busbars, wherein the magnetic-material portion of the one of the at least two metal busbars is adjacent to the magnetic-material portion of the another of the at least two metal busbars.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

Figure 1:
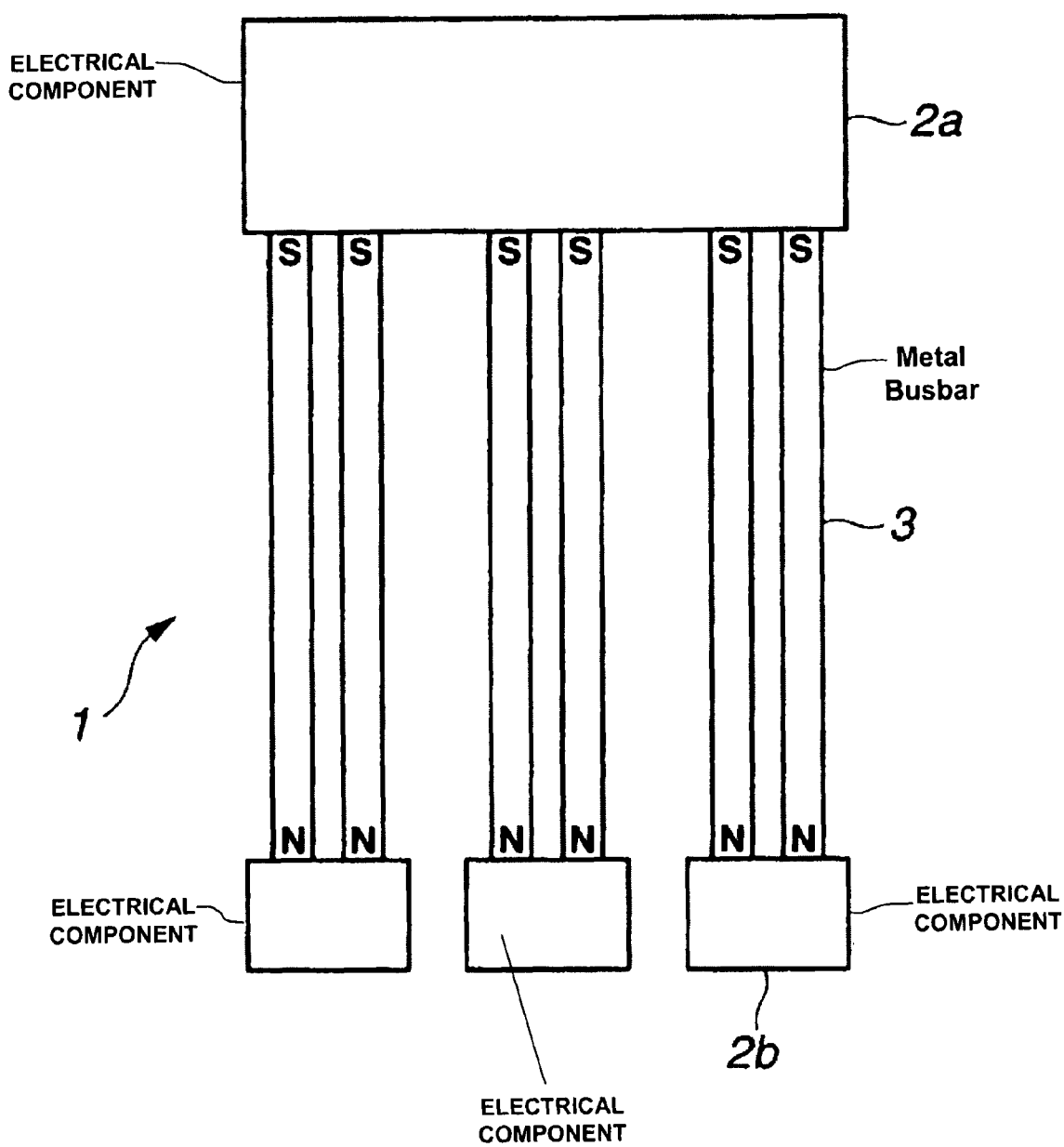
FIG. 1 is a schematic configuration view showing a portion of control circuit in a control unit according to a first embodiment of the present invention.

At first, a structure according to a first embodiment of the present invention will be now explained with reference to FIG. 1. FIG. 1 is a schematic configuration view showing a portion of a control circuit provided inside a control unit. In this embodiment, the control unit is exemplified as a unit disposed in oil within an oil pan for vehicle.

Control circuit 1 includes electronic components (electronic parts) 2a and 2b, and a plurality of metal busbars (conductive metal bars) 3. Each metal busbar 3 electrically connects electronic component 2a with electronic component 2b. Electronic component 2a is, for example, a controller including an electronic substrate (circuit board) and the like. Electronic component 2b is, for example, a terminal portion for being connected with an external electronic component such as an oil temperature sensor. However, electronic components 2a and 2b according to the first embodiment are not limited to the above-mentioned kinds of component.

Each metal busbar 3 is formed of magnetic material (substance), and electrically connects electronic component 2a with electronic component 2b inside a casing of the control unit. Namely, metal busbar 3 is interposed between electronic component 2a and electronic component 2b to connect electronic component 2a and electronic component 2b with each other. Each metal busbar 3 is magnetized, namely in magnetically polarized state. The plurality of metal busbars 3 are disposed in parallel with (or along) one another, and adjacent two metal busbars 3 have been magnetized to have substantially same magnetic property as each other. Namely, magnetic poles of one metal busbar 3 are arranged to generate magnetic force in the same direction as the other metal busbar 3 disposed in parallel with the one metal busbar 3, and the one metal busbar 3 is magnetized so as to substantially equalize the magnetic force thereof with that of the other metal busbar 3. For example, each parallel-disposed metal busbar 3 has been magnetized to allow one side of metal busbar 3 which is connected to electronic component 2a to become south pole, and to allow another side of metal busbar 3 which is connected to electronic component 2b to become north pole. In lieu thereof, the magnetic poles of metal busbar 3 may be constructed conversely, namely to allow one side of metal busbar 3 which is connected to electronic component 2a to become the north pole, and to allow another side of metal busbar 3 which is connected to electronic component 2b to become the south pole.

By virtue of the above-mentioned structure, a short circuit (circulatory shunt) between metal busbars 3 disposed in parallel with each other can be suppressed, even in the case where a contamination (contaminants or foreign object) gets mixed into the control unit.

Figure 2:
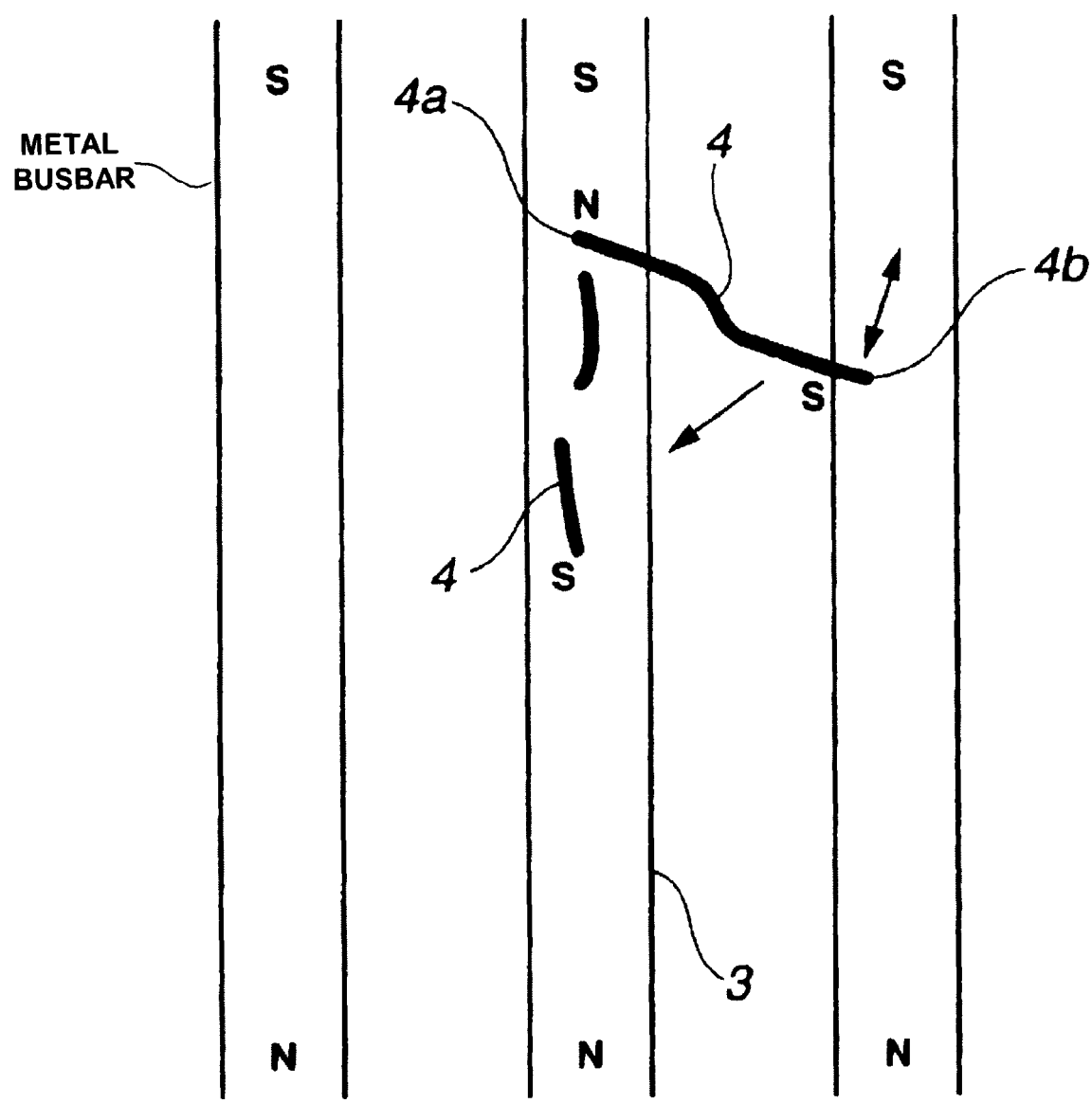
FIG. 2 is a view showing an appearance of sticking of a contamination according to the first embodiment.

Next, FIG. 2 shows the contamination 4 sticking or clinging to metal busbar 3 in the case where contamination 4 gets mixed into or enters the control unit constructed according to this embodiment.

When contamination 4 gets mixed inside the control unit, and an end portion 4a of contamination 4 comes in contact with the south pole of metal busbar 3; end portion 4a making contact with the south pole of metal busbar 3 is made to be north pole, and another end portion 4b of contamination 4 is made to be south pole.

Although end portion 4a of contamination 4 which is in contact with the south pole of metal busbar 3 is attracted to metal busbar 3 by virtue of magnetic force of metal busbar 3, another end portion 4b of contamination 4 is drifting or flowing within the oil. At this time, the other metal busbar 3 placed next to (or near) the metal busbar 3 currently contacting contamination 4 has the same magnetic property as the metal busbar 3 currently contacting contamination 4, and magnetic poles (respective north poles and south poles) of these two metal busbars 3 are aligned in the same direction. Accordingly, end portion 4b having the magnetic polarity of south pole reacts against or repels the other metal busbar 3 placed next to (or near) the metal busbar 3 contacting (end portion 4a of) contamination 4.

Then, end portion 4b having the magnetic polarity of south pole is attracted to a north-pole side of the metal busbar 3 contacting contamination 4, by virtue of magnetic force. Then, end portion 4b sticks to the metal busbar 3 already contacting end portion 4a of contamination 4. Contamination 4 under this state is shown by a broken line in FIG. 2. Each of the other parallel-disposed metal busbars 3 also can cause any contamination 4 mixed into the control unit to stick to the each of the other parallel-disposed metal busbars 3 in the similar manner as explained above, and thereby the short circuit between metal busbars 3 can be avoided.

In this embodiment, the above explanations are given on the precondition that the control unit is provided in oil. However, the structure according to this embodiment of the present invention is not limited to this precondition, and is also applicable to a control unit provided in outside-air ambient atmosphere.

Moreover in this embodiment, the above explanations are given on the precondition that each metal busbar 3 is formed in a linear shape. However, the structure according to this embodiment of the present invention is not limited to this precondition, namely is also applicable to the case where each metal busbar 3 is formed in a complex shape including a bending portion and the like. Even in such a case, by forming metal busbars 3 out of magnetic material, the short circuit which is possibly caused between metal busbars 3 due to contamination 4 can be suppressed.

Effects and benefits according to the first embodiment of the present invention will be now explained.

In the first embodiment; each metal busbar 3 establishing the electrical connection between electronic component 2a and electronic component 2b is formed of magnetic material, and metal busbars 3 provided in parallel with (or along) one another inside the control unit are formed to have the substantially identical magnetic property to one another. Further, metal busbars 3 provided along one another are disposed to line (their north and south) magnetic poles so as to generate magnetic forces of metal busbars 3 in the same direction. Therefore, for example, even if contamination 4 gets mixed into the control unit, contamination 4 is prevented from bridging (getting in contact with) two metal busbars 3 disposed in parallel with each other, so that contamination 4 is forced to stick to one metal busbar 3. Thus, the short circuit between metal busbars 3 due to the entry of contamination 4 can be suppressed in the control unit.

By magnetizing metal busbars 3, contamination 4 can be made to stick to one metal busbar 3 constituting (included in) control circuit 1. Accordingly, it is unnecessary to provide a magnet or the like for attracting or sticking to contamination 4 inside the control unit. Thus, the control unit can be designed to be smaller, i.e., downsized.

Even when the power supply of the control unit is turned off, the state where contamination 4 is sticking to metal busbar 3 is maintained. Accordingly, the points (area) which are liable to cause the short circuit due to contamination 4 can be identified, and thereby the measures to make sure the control unit doesn't fail can be implemented. Namely, the point (area) of the control unit at which the short circuit is relatively easy to occur can be determined for undertaking the countermeasures thereagainst.

It is unnecessary to prepare and provide a complex shape of the casing, a sealing compound (agent) for being used when e.g., connecting the control unit with an external electronic component, and the like; in order to prevent contamination 4 from entering or in order to prevent the short circuiting trouble between adjacent metal busbars 3 from occurring. Accordingly, the control unit can be simplified and miniaturized so that a reduction in cost is achieved.

Next, a second embodiment of the present invention will be now explained with reference to FIG. 3. In this second embodiment, structures different from FIG. 1 are mainly explained. In this second embodiment, the structure of a metal busbar 10 is different from the first embodiment and hence will be explained at first.

Metal busbar 10 includes a magnetic member (magnetic-material portion) 11 and a conductive non-magnetic member (non-magnetic-material portion) 12. An end portion of metal busbar 10 is non-magnetic member 12, namely, one of non-magnetic members 12 is located at the end portion of metal busbar 10. Namely, metal busbar 10 is formed, by alternately placing magnetic members 11 and non-magnetic members 12 on the one non-magnetic member 12 defined as the end portion of metal busbar 10, and by electrically connecting these magnetic members 11 and non-magnetic members 12 in series with one another. In other words, metal busbar 10 includes both end portions formed of non-magnetic material and an intermediate portion formed by repeatedly connecting magnetic material and non-magnetic material alternately in series with each other, so that metal busbar 10 electrically connects electronic component 2a with electronic component (e.g., terminal portion) 13.

Figure 3:
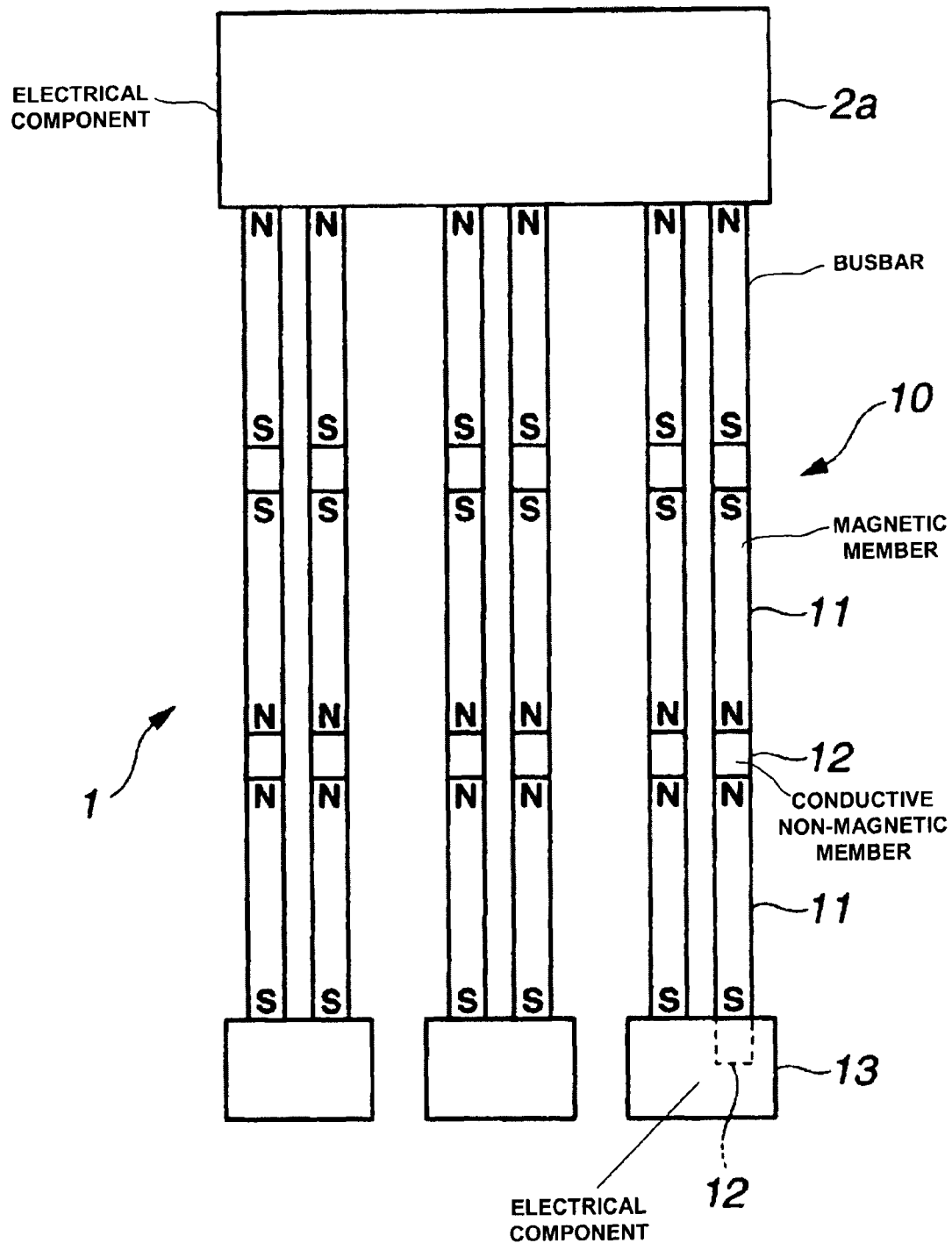
FIG. 3 is a schematic configuration view showing a portion of control circuit in a control unit according to a second embodiment of the present invention.

Since non-magnetic member 12 is provided as the end portion of metal busbar 10; a portion of metal busbar 10 for being connected with terminal portion 13 of the control unit can be non-magnetic member 12 placed inside terminal portion 13 as shown by a broken line in FIG. 3, and a portion of metal busbar 10 for protruding from a surface of terminal portion 13 can be an end portion of magnetic member 11, for example in the case where the control unit is connected with an external electronic component. Namely, only the non-magnetic member 12 corresponding to the end portion of metal busbar 10 can be inserted into terminal portion 13 to connect metal busbar 10 with terminal portion 13. Since there may be spots remaining open to the external (clearances continuing to outside of the control unit) in the vicinity of terminal portion 13 of the control unit, there is a possibility that contamination 4 enters through this spot (clearance) into the control unit. However, by positioning the end portion of magnetic member 11 at the metal busbar 10's portion starting to protrude from terminal portion 13, contamination 4 can be made to stick to this end portion of magnetic member 11 which is strong in magnetic force. Thereby, contamination 4 can be more prevented from entering or moving to the inside of the control unit, and hence the short circuit between metal busbars 10 due to contamination 4 can be more prevented from occurring in the control unit. Moreover, in the case where metal busbars 10 are electrically connected with each other inside electronic component 2a, the magnetic properties of these metal busbars 10 can be made to be independent of each other by providing non-magnetic member 12 at the end portion of each metal busbar 10 as explained above.

In metal busbar 10, two magnetic members 11 are placed to sandwich non-magnetic member 12 between the same magnetic poles (north poles or south poles) of this two magnetic members 11. Namely, the plurality of magnetic members 11 are electrically connected with non-magnetic members 12 so as to cause non-magnetic member 12 to be sandwiched between end portions of two magnetic members 11 which have the identical magnetic pole. For example, when two magnetic members 11 are electrically connected with each other through one non-magnetic member 12, the two magnetic members 11 are placed so as to connect the respective north-pole sides (or respective south-pole sides) of these two magnetic members 11 with both (longitudinal) ends of the one non-magnetic member 12. In other words, the longitudinal ends of two magnetic members 11 which have the identical magnetic pole face each other through non-magnetic member 12.

As explained above, metal busbar 10 is formed by alternately placing magnetic members 11 and non-magnetic members 12 and then electrically connecting the placed magnetic members 11 and non-magnetic members 12 with each other. Accordingly, a variation of (positional) magnetic force of metal busbar 10 relative to a longitudinal direction of metal busbar 10 can be reduced, so that the short circuit which occurs due to contamination 4 can be suppressed.

A magnetic member (material) which has been magnetized has relatively weak magnetic force at a portion between the opposite two magnetic poles, i.e., near the center of the magnetic member. Therefore, in the case where the metal busbar is constructed by using only one magnetic member and in the case where the metal busbar is long; there is relatively high possibility that the short circuit between adjacent two metal busbars disposed along each other occurs due to a contamination near the center of the magnetic member. However in this embodiment, metal busbar 10 is formed by alternately placing and connecting magnetic members 11 and non-magnetic members 12, i.e., by connecting one set of magnetic member 11 and non-magnetic member 12 with the other set of magnetic member 11 and non-magnetic member 12. Accordingly, even in the case where the longitudinal length of metal busbar 10 becomes long; the positional variation of magnetic force in the longitudinal direction of metal busbar 10 can be made small, so that the short circuit which occurs due to contamination 4 can be suppressed.

In this embodiment, the example that metal busbar 10 includes three magnetic members 11 connected with one another through non-magnetic members 12 has been explained. However, the number of magnetic members 11 is not limited to three, and may be greater or smaller than three.

Effects and benefits according to the second embodiment of the present invention will be now explained.

According to the second embodiment; one metal busbar 10 is constituted by magnetic members 11 and conductive non-magnetic members 12. Therefore, even in the case where the length of metal busbar 10 becomes long, the short circuit which occurs due to contamination 4 can be suppressed between adjacent two metal busbars 10. Particularly in the proximity of the center of metal busbar 10, the short circuit can be suppressed between the opposite magnetic poles of metal busbar 10.

Even if it is necessary to design the shape of metal busbar 10 to be complex, e.g., a shape including a bending portion; magnetic members 11 and non-magnetic members 12 can be arranged according to this desired shape of metal busbar 10, e.g., by placing non-magnetic member 12 at the bending portion. Moreover in this case, the lengths of magnetic members 11 and non-magnetic members 12 can be adjusted according to the desired shape of metal busbar 10. Thereby, the magnetic properties of adjacent metal busbars 10 can be adjusted, so that the short circuit between two metal busbars 10 disposed along each other can be suppressed.

According to the second embodiment; the end portion of metal busbar 10 corresponds to non-magnetic member 12. Therefore, by inserting non-magnetic member 12 corresponding to the end portion of metal busbar 10 into terminal portion 13 provided for being connected with an external electronic component, the metal busbar 10's portion starting to protrude from terminal portion 13 can be the end portion of magnetic member 11. Namely, an end of magnetic member 11 can be positioned to correspond to an inner end of terminal portion 13 as shown in FIG. 3. Thereby, contamination 4 entering and moving from the vicinity of terminal portion 13 into the control unit can be made to stick to the end portion of magnetic member 11 which has strong magnetic force. Thus, the short circuit between metal busbars 10 due to contamination 4 can be prevented from occurring inside the control unit.

Figure 4:
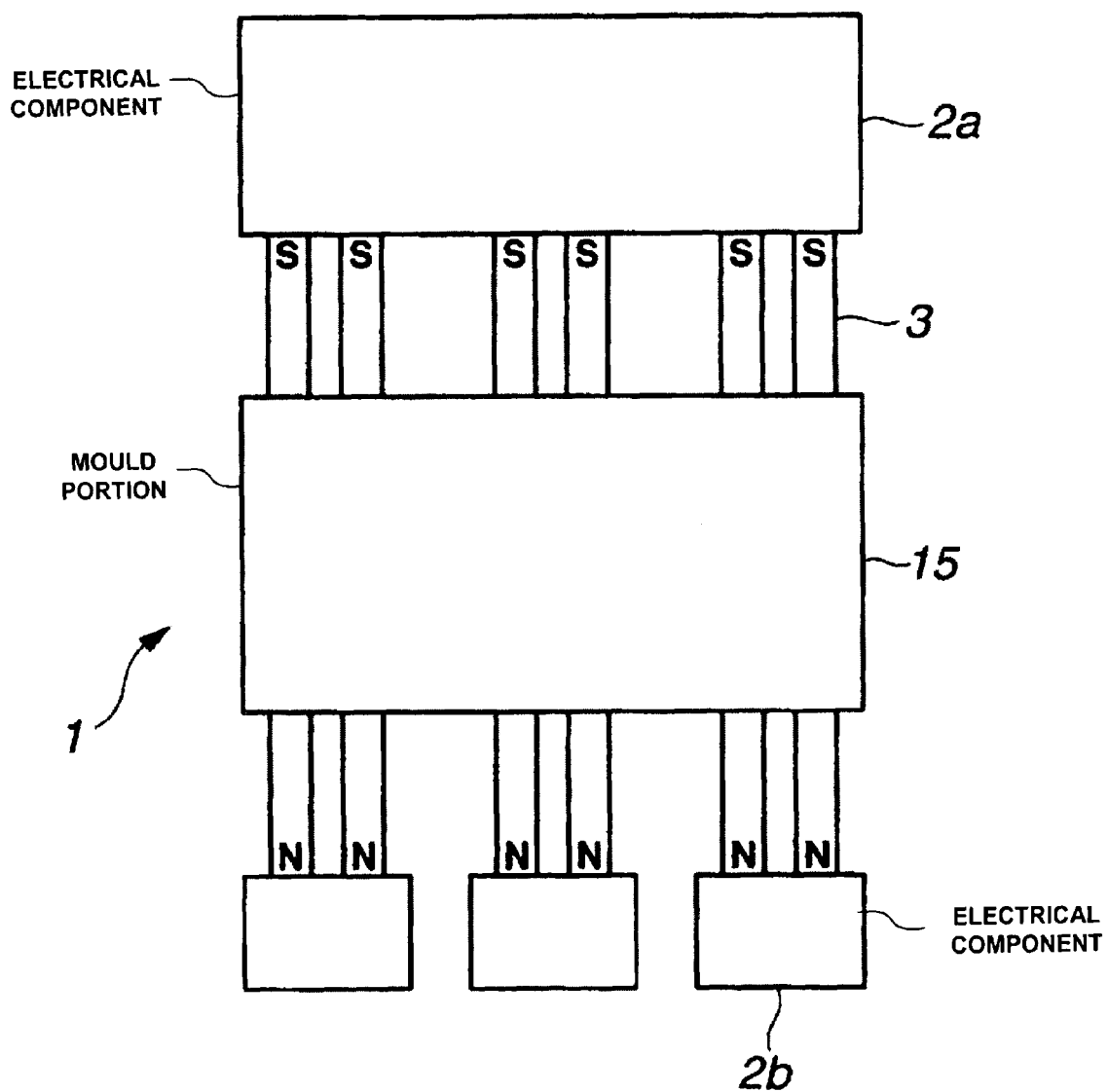
FIG. 4 is a schematic configuration view showing a portion of control circuit in a control unit according to a third embodiment of the present invention.

Next, a third embodiment of the present invention will be now explained with reference to FIG. 4. In this third embodiment, structures different from FIG. 1 are mainly explained. In the structure according to this third embodiment, a mould portion (enclosing portion) 15 is provided in addition to the structure of the first embodiment.

Mould portion 15 is provided so as to enclose or be moulded to metal busbars 10 in the proximity of the longitudinal centers of metal busbars 10. Namely, mould portion 15 encloses the whole of center portion of metal busbar 10 or covers a part of center portion of metal busbar 10. Mould portion 15 is an insulating member formed of insulating material, and hence does not make an electrical connection between metal busbars 10 disposed in parallel with each other. Although the magnetized metal busbar 10 has the property of making magnetic force relatively weak near the center of metal busbar 10, mould portion 15 is provided over an area close to the center of metal busbar(s) 10 in this embodiment. Accordingly, the short circuit between metal busbars 10 can be prevented from occurring near the center of metal busbar 10 due to contamination 4 intruding into the control unit.

Effects and benefits according to the third embodiment of the present invention will be now explained.

According to the third embodiment; since the insulating mould portion 15 is provided near the center of metal busbar 10 and between the magnetic poles of metal busbar 10, the short circuit due to contamination 4 can be suppressed between metal busbars 10 disposed along each other.

This application is based on a prior Japanese Patent Application No. 2007-091028 filed on Mar. 30, 2007. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control unit comprising:

a plurality of electronic components, and at least two metal busbars disposed along each other, wherein each of the at least two metal busbars establishes an electrical connection between the electronic components and includes a magnetic-material portion, wherein the at least two metal busbars are arranged to cause the magnetic-material portion of one of the at least two metal busbars to have magnetic poles generating a magnetic force, including when there is no power supply for the busbars, substantially in a same direction as that of the magnetic-material portion of another of the at least two metal busbars, wherein the magnetic-material portion of the one of the at least two metal busbars is adjacent to the magnetic-material portion of the another of the at least two metal busbars.

2. The control unit as claimed in claim 1, wherein:

each of the at least two metal busbars includes a plurality of magnetic-material portions and further a plurality of conductive non-magnetic material portions; and each of the at least two metal busbars is constructed by alternately connecting the plurality of magnetic-material portions with the plurality of conductive non-magnetic material portions.

3. The control unit as claimed in claim 2, wherein each of the at least two metal busbars is constructed by alternately connecting the plurality of magnetic-material portions with the plurality of conductive non-magnetic material portions so as to cause the conductive non-magnetic material portion to be sandwiched between end portions of the two magnetic-material portions, the end portions having an identical magnetic pole.

4. The control unit as claimed in claim 1, further comprising:

a mould portion moulded to a portion close to a center of the magnetic-material portion between the opposite magnetic poles of the magnetic-material portion.

5. The control unit as claimed in claim 1, wherein the control unit is mounted within oil.

6. A vehicle, comprising:

a casing including oil, and a control unit as claimed in claim 1, wherein the control unit is mounted within the oil of the casing.

* * * * *